United States Patent Office 2,895,997
Patented July 21, 1959

2,895,997

SELF-CONDENSATION OF HALOALKYL-AROMATIC COMPOUNDS

Louis Schmerling, Riverside, and John P. Luvisi, Des Plaines, Ill., assignors, by mesne assignments, to Universal Oil Products Company, Des Plaines, Ill., a corporation of Delaware No Drawing. Application February 28, 1957
Serial No. 642,952

12 Claims. (Cl. 260—649)

This invention relates to a process for the self-condensation of haloalkylaromatic compounds and more particularly to a process for the self-condensation of p-haloalkylbenzenes.

An object of this invention is to provide a process for the self-condensation of haloalkylaromatic compounds.

A further object of this invention is to provide a process for the self-condensation of p-haloalkylbenzenes by treating said benzenes with an alkylating agent.

One embodiment of this invention resides in a process for the self-condensation of haloalkylbenzenes having the general formula:

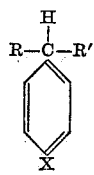

in which R and R' are independently selected from the group consisting of hydrogen, alkyl, alkylene, cycloalkylalkyl and cycloalkyl radicals and X is a halogen radical by treating said haloalkylbenzene with an alkylating agent in the presence of an alkylation catalyst, and recovering the resultant self-condensation products.

A further embodiment of this invention is found in a process for self-condensing a p-haloalkylbenzene having the general formula:

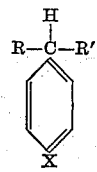

in which R and R' are independently selected from the group consisting of hydrogen, alkyl, alkylene, cycloalkylalkyl, and cycloalkyl radicals and X is a halogen radical by treating said haloalkylbenzene with an alkylating agent selected from the group consisting of tert-alkyl halides, tert-cycloalkyl halides and polyhaloalkanes containing at least two halogen atoms attached to the same carbon atom at a temperature in the range of from about 0° to about 100° C., and recovering the resultant self-condensation products.

A specific embodiment of the invention is found in a process for the self-condensation of p-chlorotoluene which comprises treating said p-chlorotoluene with tert-butyl chloride in the presence of aluminum chloride at a temperature in the range of from about 25° to about 50° C., and recovering the resultant self-condensation products.

Other objects and embodiments referring to alternative p-haloalkylbenzenes, alkylating agents and alkylation catalysts will be found in the following further detailed description of the invention.

It has now been discovered that a hydrogen transfer reaction will take place when a p-haloalkylaromatic compound, and more particularly a p-haloalkylbenzene is treated with an alkylating agent in the presence of an alkylation catalyst such as certain active Friedel-Crafts type metal halides to form a self-condensation product of the p-haloalkylbenzene. The self-condensation reaction of this invention may be illustrated by the reaction of p-chlorotoluene with tert-butyl chloride, for example, as shown by the following equation:

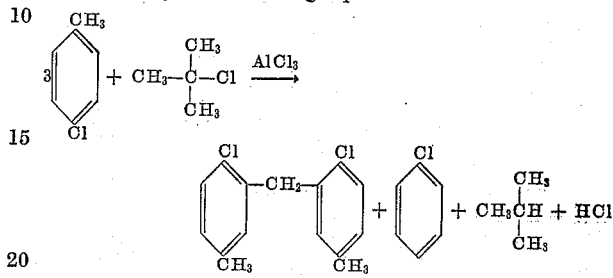

The thus formed self-condensation products may be sulfonated and the resulting derivatives then used as wetting agents. It is also possible to nitrate the condensation products with, for example, a mixture of nitric and sulfuric acid and to reduce the resultant product to form mono- and polyamines, these mono- and polyamines being useful as oxidation inhibitors. In addition the amines may in turn be converted to phenols by diazotization followed by hydrolysis to form bis-phenolic compounds which are also useful as oxidation inhibitors.

p-Haloalkyl aromatic compounds of the general formula:

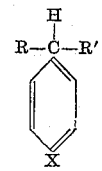

in which R and R' are independently selected from the group consisting of hydrogen, alkyl, alkylene, cycloalkylalkyl and cycloalkyl radicals and in which X is a halogen radical, preferably chlorine and bromine (i.e. halogens having an atomic weight of between 35 and 80) which may be self-condensed according to the process of this invention include those in which R and $R_1$ are each hydrogen such as: p-chlorotoluene, p-bromotoluene; those in which R is alkyl and $R_1$ is hydrogen, such as: p-chloroethylbenzene, p-bromoethylbenzene, p-chloropropylbenzene, p-bromopropylbenzene, p-chlorobutylbenzene, p-bromobutylbenzene, p-chloroamylbenzene, p-bromoamylbenzene, p-chloroisobutylbenzene, p-bromoisobutylbenzene, p-chloroisoamylbenzene, p-bromoisoamylbenzene; those in which R and $R_1$ are each alkyl such as: p-chloroisopropylbenzene, p-bromoisopropylbenzene, p - chloro - sec - butylbenzene, p - bromo - sec - butylbenzene; those in which R and $R_1$ are together alkylene such as: p-chlorocyclopentylbenzene, p-bromocyclopentylbenzene, p - chlorocyclohexylbenzene, p - bromocyclohexylbenzene, p - chloro(2 - methylcyclopentyl)benzene, p - bromo(2 - methylcyclopentyl)benzene, p - chloro-(2 - ethylcyclopentyl) - benzene, p - bromo(2 - ethylcyclopentyl)benzene, p - chloro(2 - methylcyclohexyl)-benzene, p - bromo (2 - methylcyclohexyl)benzene, p-chloro - (2 - ethylcyclohexyl)benzene, p - bromo(2-ethylcyclohexyl)benzene; those in which R is cycloalkyl and $R_1$ is hydrogen such as: p-chloro(cyclopentylmethyl)-benzene, p-bromo(cyclopentylmethyl)-benzene, p-chloro-(cyclohexylmethyl)benzene, p-bromo(cyclohexylmethyl)-benzene; and those in which R is cycloalkylalkyl and $R_1$ is hydrogen such as: p-chloro(2-cyclopentylethyl)benzene, p-bromo(2-cyclopentylethyl)benzene, p-chloro(2-cyclohexylethyl) - benzene, p - bromo(2 - cyclohexylethyl)benzene, etc.

Suitable alkylating agents which may be reacted with the aforementioned p-haloalkylbenzenes include tertiary alkyl halides in which the halogen has an atomic weight of between 35 and 80 (i.e., bromine and chlorine) such as tert-tubyl chloride, tert-butyl bromide, tert-pentyl chloride, tert-pentyl bromide, tert-hexyl chloride, tert-hexyl bromide, etc.; tertiary cycloalkyl halides such as 1-chloro-1-methyl-cyclopentane, 1 - chloro-1-ethylcyclopentane, 1-bromo-1-methylcyclopentane, 1-bromo-1-ethylcyclopentane, 1 - chloro - 1 - methylcyclohexane, 1-chloro-1-ethylcyclohexane, 1 - bromo-1-methylcyclohexane, 1-bromo-1-ethylcyclohexane, 1-chloro-1-methylcycloheptane, 1-chloro-1-ethylcycloheptane, 1 - bromo-1-methyl-1-cycloheptane, 1-bromo-1-ethylcyclohexane, etc.; and polyhaloalkanes containing at least two halogen atoms attached to the same carbon atom such as dichloromethane, chloroform, carbon tetrachloride, dibromomethane, bromoform, carbon tetrabromide, 1,1-dichloroethane, 1,1,2-trichloroethane, 1,1-dibromoethane, 1,1,2-tribromoethane, 1,1-dichloropropane, 1,1-dibromopropane, 2,2-dichloropropane, 2,2-dibromopropane, 1,1,2-trichloropropane, 1,1,2-tribromopropane, 1,2,2-chloropropane, 1,2,2-tribromopropane, 1,1-dichlorobutane, 1,1-dibromobutane, 2,2-dichlorobutane, 2,2-dibromobutane, 1,1,2-trichlorobutane, 1,1,2-tribromobutane, 1,1-dichloro-3-methylbutane, 1,1-dibromo-3-methylbutane, 1,1,2-trichloro-3-methylbutane, 1,1,2 - tribromo-3-methylbutane, 1,1-dichloro-3,3-dimethylbutane, etc. It is to be understood that the aforementioned p-haloalkylbenzenes and alkylating agents are only representatives of the class of compounds which may be used, and that the process of this invention is not necessarily limited thereto.

The self-condensation of the p-haloalkylbenzenes which is accomplished by reacting said benzenes with a suitable alkylating agent takes place in the presence of certain alkylating agents, comprising certain active Friedel-Crafts type metal halide catalysts, said catalysts including in particular aluminum chloride, aluminum bromide, zirconium chloride and boron fluoride. For purposes of this invention the catalyst comprising boron fluoride, although a metalloid halide, will be included in the generic group of metal halide catalysts.

The reaction conditions under which the process of the present invention takes place will depend upon the particular reactants and catalysts used in each self-condensation reaction. In general, the reaction will take place at temperatures ranging from about 0° to about 100° C., and preferably at a temperature in the range of from about room temperature (about 20–25° C.) to about 80° C. In addition, the pressures at which this reaction takes place should be sufficient to maintain at least a substantial portion of the reactants in the liquid phase and may range from atmospheric to about 300 p.s.i. or higher. If so desired, the reaction may be carried out in the presence of an organic solvent; however, the particular solvent to be used must be inert and should not enter into the reaction nor act as a hydrogen donor. Inert solvents which may be used in this invention include normal paraffins such as n-pentane, n-hexane, n-heptane, etc. and cycloparaffins such as cyclopentane, cyclohexane, etc.

The process of this invention may be effected in any suitable manner and may comprise either a batch or a continuous type operation. For example, when a batch type operation is used a quantity of the p-haloalkylbenzene and the catalyst is placed in an appropriate condensation apparatus such as an alkylating flask and a mixture of the alkylating agent dissolved in an additional amount of the p-haloalkylbenzene is gradually added thereto, the reaction mixture being continually stirred throughout the duration of the addition. The temperature and pressure is maintained at the desired levels throughout the addition period and for a subsequent reaction time, the stirring of the mixture continuing during this additional reaction time. At the end of the predetermined reaction time the reaction product is separated from any unreacted starting material, washed with water, dilute alkali, or an organic solvent, dried and subjected to fractional distillation under reduced pressure to recover the desired product.

The self-condensation of the p-haloalkylbenzene may also be effected in a continuous reaction. In this type of operation the p-haloalkylbenzene is continuously charged to a reactor which is maintained at the proper operating conditions of temperature and pressure and containing the desired catalyst. The reactor may comprise an unpacked vessel or coil or may be lined with an adsorbent packing material such as alumina, fire brick, dehydrated bauxite, and the like. The desired alkylating agent comprising a tertiary alkylhalide, tertiary cycloalkylhalide or polyhaloalkane of the type hereinbefore described is also continuously charged to the reactor through a separate line or, if so desired, may be admixed with the p-haloalkylbenzene prior to admission into said reactor and charged thereto in a single line. A particularly suitable type of operation comprises a fixed bed type in which the metal halide catalyst is disposed as a fixed bed in the reactor and the reactants are passed therethrough in either an upward or downward flow. The reaction product is continuously withdrawn from the reactor, separated from the reactor effluent and purified by conventional means hereinbefore set forth, while the unreacted starting materials may be recycled to form a portion of the feed stock. Other continuous types of operation which may be used in this process include the compact moving bed type of operation in which the catalysts and the reactants are passed either concurrently or countercurrently to each other, and the slurry type process in which the catalyst is carried into the reaction zone as a slurry in the p-haloalkylbenzene. It is to be understood that in each of the latter mentioned types of processes the unreacted starting materials may be separated out and recycled for use as a portion of the feed material while the desired product is withdrawn and purified.

The following examples are given to illustrate the process of the present invention which, however, are not intended to limit the generally broad scope of the present invention in strict accordance therewith.

*Example I*

A mixture comprising 129 g. (1.34 moles) of p-chlorotoluene and 10 g. of aluminum chloride was placed in an alkylating flask provided with stirring means. While the mixture was continuously stirred, 45 g. (0.49 mole) of tert-butyl chloride dissolved in 42 g. of p-chlorotoluene was gradually added thereto. The flask was maintained at room temperature (24–26° C.) during the addition of the alkylating agent and p-chlorotoluene, said addition of the alkylating agent taking approximately 1.1 hours. After completion of the aforementioned addition, the reaction mixture was stirred for an additional 0.3 hour during which time the temperature of the flask was maintained at approximately 24° C. At the end of this time the upper layer comprising 197 g. of reaction product was separated from the lower catalyst layer, washed with pentane, dried and subjected to fractional distillation under reduced pressure. Material boiling from 150° to 204° C. at pressures ranging from 2.2 to 2.0 mm. (340° to 415° C. at 760 mm. pressure) was separated out and redistilled at reduced pressure. A cut boiling at 156° C. at 1.8 mm. pressure (351° C. at 760 mm. pressure) was obtained. This cut comprising 18 g. of bis-(p-chlorotolyl)methane had a refractive index $n_D^{20}$ 1.5895. The cut was analyzed with the following results:

Calcd. for $(CH_3C_6H_3Cl)_2CH_2$ or $C_{15}H_{14}Cl_2$: C, 67.94; H, 5.32; Cl, 26.74. Found: C, 68.13; H, 5.43; Cl, 26.65.

Example II

A mixture of 129 g. (1.34 moles) of p-chlorotoluene and 10 g. of aluminum chloride were placed in an alkylation flask provided with stirring means. A solution of 48 g. (0.49 mole) of 1,1-dichloroethane dissolved in 42 g. of p-chlorotoluene was slowly added during a period of about 1.3 hours while said mixture was being continuously stirred. The temperature of the flask was maintained at about 26–30° C. during the addition period which took about 1.3 hours. At the end of the addition time the reaction mixture was stirred for an additional 0.5 hour while the temperature of the flask was maintained at about 27° C. At the end of this time the upper layer containing the reaction product and measuring 198 g. was separated from the lower catalyst layer, washed with pentane, dried and subjected to fractional distillation under reduced pressure. There was obtained 32 g. of material boiling in the range of from about 151–160° C. at pressures of from 1.6 to 1.8 mm. (351–360° C. at 760 mm. pressure). This was filtered to remove a relatively small amount of crystalline by-product and submitted to fractional redistillation under reduced pressure. A cut boiling at 148° C. at 1.3 mm. pressure (353° C. at 760 mm. pressure) comprising about 25 g. of bis-(p-chlorotolyl)methane was separated out and analyzed with the following results:

Calcd. for $(CH_3C_6H_3Cl)_2CH_2$ or $C_{15}H_{14}Cl_2$: C, 67.94; H, 5.32; Cl, 26.74. Found: C, 68.18; H, 5.31; Cl, 26.61.

We claim as our invention:

1. A process for the self-condensation of a p-haloalkylbenzene having the general formula:

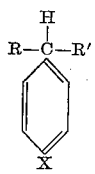

in which R and R' are independently selected from the group consisting of hydrogen, alkyl, alkylene, cycloalkylalkyl and cycloalkyl radicals and X is a halogen radical which comprises treating said haloalkylbenzene with an alkylating agent selected from the group consisting of tert-alkyl halides, tert-cycloalkyl halides and polyhaloalkanes containing at least two halogen atoms on the same carbon atom, the halogen of said alkylating agent being selected from the group consisting of chlorine and bromine, in the presence of an alkylation catalyst selected from the group consisting of aluminum chloride, aluminum bromide, zirconium chloride and boron fluoride at a temperature in the range of from about 0° to about 100° C., and recovering the resultant self-condensation products.

2. A process for the self-condensation of a p-haloalkylbenzene having the general formula:

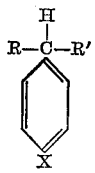

in which R and R' are independently selected from the group consisting of hydrogen, alkyl, alkylene, cycloalkylalkyl and cycloalkyl radicals and X is a halogen radical which comprises treating said haloalkylbenzene with tert-butyl chloride in the presence of an alkylation catalyst selected from the group consisting of aluminum chloride, aluminum bromide, zirconium chloride and boron fluoride at a temperature in the range of from about 0° to about 100° C., and recovering the resultant self-condensation products.

3. A process for the self-condensation of a p-haloalkylbenzene having the general formula:

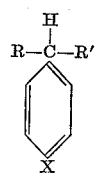

in which R and R' are independently selected from the group consisting of hydrogen, alkyl, alkylene, cycloalkylalkyl and cycloalkyl radicals and X is a halogen radical which comprises treating said haloalkylbenzene with 1,1-dichloroethane in the presence of an alkylation catalyst selected from the group consisting of aluminum chloride, aluminum bromide, zirconium chloride and boron fluoride at a temperature in the range of from about 0° to about 100° C., and recovering the resultant self-condensation products.

4. A process for the self-condensation of a p-haloalkylbenzene having the general formula:

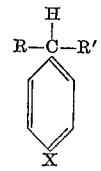

in which R and R' are independently selected from the group consisting of hydrogen, alkyl, alkylene, cycloalkylalkyl and cycloalkyl radicals and X is a halogen radical which comprises treating said haloalkylbenzene with 1-chloro-1-methylcyclohexane in the presence of an alkylation catalyst selected from the group consisting of aluminum chloride, aluminum bromide, zirconium chloride and boron fluoride at a temperature in the range of from about 0° to about 100° C., and recovering the resultant self-condensation products.

5. A process for the self-condensation of p-chlorotoluene which comprises treating said p-chlorotoluene with tert-butyl chloride in the presence of aluminum chloride at a temperature in the range of from about 25° to about 30° C., and recovering the resultant self-condensation products.

6. The process of claim 1 further characterized in that X in said formula is selected from the group consisting of chlorine and bromine.

7. The process of claim 1 further characterized in that said catalyst is aluminum chloride.

8. The process of claim 1 further characterized in that said alkylating agent is a tert-alkyl halide.

9. The process of claim 1 further characterized in that said alkylating agent is a tert-cycloalkyl halide.

10. The process of claim 1 further characterized in that said alkylating agent is a polyhaloalkane.

11. A process for the self-condensation of p-chlorotoluene which comprises treating said p-chlorotoluene with 1,1-dichloroethane in the presence of aluminum chloride at a temperature in the range of from about 25° to about 30° C., and recovering the resultant self-condensation products.

12. A process for the self-condensation of p-chlorotoluene which comprises treating said p-chlorotoluene with 1-chloro-1-methylcyclohexane in the presence of aluminum chloride at a temperature in the range of from about 25° to about 30° C., and recovering the resultant self-condensation products.

No references cited.